(12) United States Patent
Matsunami (10) Patent No.: US 10,990,796 B2
(45) Date of Patent: Apr. 27, 2021

(54) INFORMATION PROCESSING APPARATUS, IMAGE PROCESSING METHOD AND RECORDING MEDIUM ON WHICH IMAGE PROCESSING PROGRAM IS RECORDED

(71) Applicant: FUJITSU LIMITED, Kawasaki (JP)

(72) Inventor: Tomoaki Matsunami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 133 days.

(21) Appl. No.: 16/225,701

(22) Filed: Dec. 19, 2018

(65) Prior Publication Data

US 2019/0213383 A1 Jul. 11, 2019

(30) Foreign Application Priority Data

Jan. 5, 2018 (JP) .............................. JP2018-000700

(51) Int. Cl.
*G06K 9/00* (2006.01)
*G06K 9/46* (2006.01)
*G06K 9/03* (2006.01)

(52) U.S. Cl.
CPC ....... *G06K 9/00073* (2013.01); *G06K 9/0008* (2013.01); *G06K 9/00067* (2013.01); *G06K 9/00087* (2013.01); *G06K 9/036* (2013.01); *G06K 9/4604* (2013.01)

(58) Field of Classification Search
CPC .......... G06K 9/00073; G06K 9/00067; G06K 9/4604; G06K 9/0008; G06K 9/00087; G06K 9/036
See application file for complete search history.

(56) References Cited

U.S. PATENT DOCUMENTS

| 6,763,127 | B1 * | 7/2004 | Lin | G06K 9/00067 |
| | | | | 382/125 |
| 7,079,672 | B2 * | 7/2006 | Matsumoto | G06K 9/00006 |
| | | | | 340/5.83 |
| 7,853,047 | B2 * | 12/2010 | Hara | G06K 9/00073 |
| | | | | 382/116 |
| 8,014,574 | B2 * | 9/2011 | Hara | G06K 9/0008 |
| | | | | 356/71 |
| 9,582,739 | B2 * | 2/2017 | Padubrin | G06K 9/48 |
| 9,792,512 | B2 * | 10/2017 | Matsunami | G06K 9/4619 |
| 10,146,258 | B2 * | 12/2018 | Sinha | G06F 1/1643 |
| 10,460,207 | B2 * | 10/2019 | Matsunami | G06K 9/00067 |
| 2002/0181749 | A1 * | 12/2002 | Matsumoto | G06K 9/00006 |
| | | | | 382/125 |

(Continued)

FOREIGN PATENT DOCUMENTS

| JP | 2003-44856 | 2/2003 |
| JP | 2003-337949 | 11/2003 |
| JP | 2007-41925 | 2/2007 |

(Continued)

*Primary Examiner* — Nizar N Sivji
(74) *Attorney, Agent, or Firm* — Fujitsu Patent Center (57) ABSTRACT

An information processing apparatus, includes: a memory; and a processor coupled to the memory, wherein the processor: generates a sharpened image of a fingerprint image by emphasizing edges of a fingerprint pattern included in the fingerprint image; calculates an edge density of the sharpened image based on a local change of luminance; and decides based on the edge density whether each of pixels of the sharpened image is in a fingerprint region or a background region.

17 Claims, 11 Drawing Sheets

(56) References Cited

U.S. PATENT DOCUMENTS

2009/0123040 A1* 5/2009 Tatara .................. G06K 9/0008
382/125
2010/0254579 A1* 10/2010 Lee ........................ G06K 9/036
382/124

FOREIGN PATENT DOCUMENTS

JP            2008-52733         3/2008
WO           2007/004537         1/2007

* cited by examiner

INFORMATION PROCESSING APPARATUS, IMAGE PROCESSING METHOD AND RECORDING MEDIUM ON WHICH IMAGE PROCESSING PROGRAM IS RECORDED

CROSS-REFERENCE TO RELATED APPLICATION

This application is based upon and claims the benefit of priority of the prior Japanese Patent Application No. 2018-700, filed on Jan. 5, 2018, the entire contents of which are incorporated herein by reference.

FIELD

The embodiment discussed herein relates to an information processing apparatus, an image processing method and a recording medium on which an image processing program is recorded.

BACKGROUND

According to a fingerprint authentication technology in which a fingerprint is used when identification of an individual is performed, feature information for identifying an individual is extracted from a fingerprint image acquired from a user.

Examples of the related art include Japanese Laid-open Patent Publication No. 2003-44856 and Japanese Laid-open Patent Publication No. 2003-337949.

SUMMARY

According to an aspect of the embodiment, an information processing apparatus, includes: a memory; and a processor coupled to the memory, wherein the processor: generates a sharpened image of a fingerprint image by emphasizing edges of a fingerprint pattern included in the fingerprint image; calculates an edge density of the sharpened image based on a local change of luminance; and decides based on the edge density whether each of pixels of the sharpened image is in a fingerprint region or a background region.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

For example, when feature information is to be extracted, a background region is reduced and only a fingerprint region is handled. However, if the background region of a fingerprint image includes noise, the distinction between the fingerprint region and the background region becomes ambiguous and this increases erroneous detection of feature points, resulting in the possibility that the authentication accuracy may be deteriorated. For example, in the case where a sensor degraded with a time-dependent variation, in the case where a less expensive and low quality sensor is used or in a like case, it is conceivable to perform processing using such a low quality fingerprint image as includes noise over a wide range of the background region. Therefore, for example, the fingerprint region and the background region are separated from each other.

For example, it is sometimes presupposed that the fingerprint region and the background region have therebetween a significant difference in average or variance of luminance values. However, in a fingerprint image in which noise is included, ridges in the fingerprint region become ambiguous, and this decreases the variance of luminance values. Meanwhile, since, in the background region, pixels of various luminance values are included, the variance of luminance values increases, and therefore, the difference in variance of luminance values between the fingerprint region and the background region decreases. As result, there is the possibility that it may become difficult to correctly separate the fingerprint region and the background region from each other. For example, if contrast adjustment is performed for a noise region of the background, the contrast increases also in the noise region, and there may be a case that the distributions of luminance values or luminance gradients in the fingerprint region and the noise region become similar to each other in comparison with that in the original image. As a result, there is the possibility that distinction between the fingerprint region and the noise region may become difficult and the possibility that noise in the background region may be detected as a fingerprint feature point in error may increase.

For example, an information processing apparatus or the like may be provided that separates a background region and a fingerprint region with a high degree of accuracy from a fingerprint image.

In the following, an embodiment is described with reference to the drawings.

Embodiment 1

Figure 1:
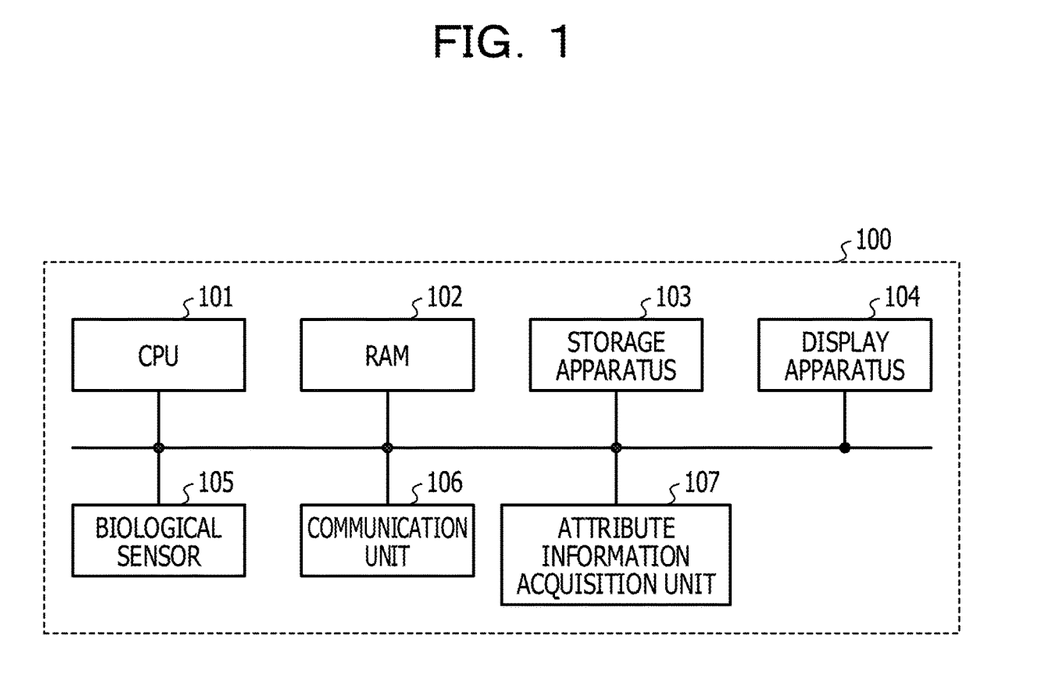
FIG. 1 is a block diagram depicting a hardware configuration of an image processing apparatus according to an embodiment 1.

FIG. 1 is a block diagram depicting a hardware configuration of an image processing apparatus according to an embodiment 1. As exemplified in FIG. 1, an image processing apparatus 100 includes a central processing unit (CPU) 101, a random access memory (RAM) 102, a storage apparatus 103, a display apparatus 104, a biological sensor 105, a communication unit 106, an attribute information acquisition unit 107 and so forth. The components mentioned are coupled to each other by a bus.

The CPU 101 is a central processing unit. The CPU 101 includes one or more cores. The RAM 102 is a volatile memory for temporarily storing programs to be executed by the CPU 101, data to be processed by the CPU 101 and so forth.

The storage apparatus 103 is a nonvolatile storage apparatus. As the storage apparatus 103, for example, a solid state drive (SSD) such as a read only memory (ROM) or a flash memory, a hard disk that is driven by a hard disk drive and so forth may be used. An image processing program according to the present embodiment is stored in the storage apparatus 103. The display apparatus 104 is a liquid crystal display, an electroluminescence panel or the like and displays a result of each process hereinafter described or the like.

The biological sensor 105 is a sensor that acquires a fingerprint image of a user. The biological sensor 105 is, for example, an optical sensor, a capacitance sensor or the like. The communication unit 106 is a coupling interface, for example, to a local area network (LAN) or the like. The attribute information acquisition unit 107 is an inputting apparatus such as a keyboard, a mouse and so forth and is an apparatus for inputting attribute information for identifying a user such as an identification (ID), a user name, a password and so forth.

The image processing program stored in the storage apparatus 103 is deployed into the RAM 102 in a executable state. The CPU 101 executes the image processing program deployed in the RAM 102. Consequently, various processes are executed by the image processing apparatus 100. When the image processing program is executed, a registration process, an authentication process and other processes are executed.

The registration process is a process for registering, associated with the attribute information of each user, a biological feature obtained from a fingerprint image acquired by the biological sensor 105 as registration biological feature. In the present embodiment, a fingerprint pattern and so forth extracted from a fingerprint image are registered as biological features. The authentication process is a process for verifying a verification biological feature acquired by the biological sensor 105 and registration biological features with each other. In the present embodiment, as an example, if the similarity between a verification biological feature acquired at the time of an authentication process and a registration biological feature registered in advance is equal to or higher than a threshold value, it is decided that the user is the same person as the registered user. Details of the registration process and the authentication process are hereinafter described.

Figure 2:
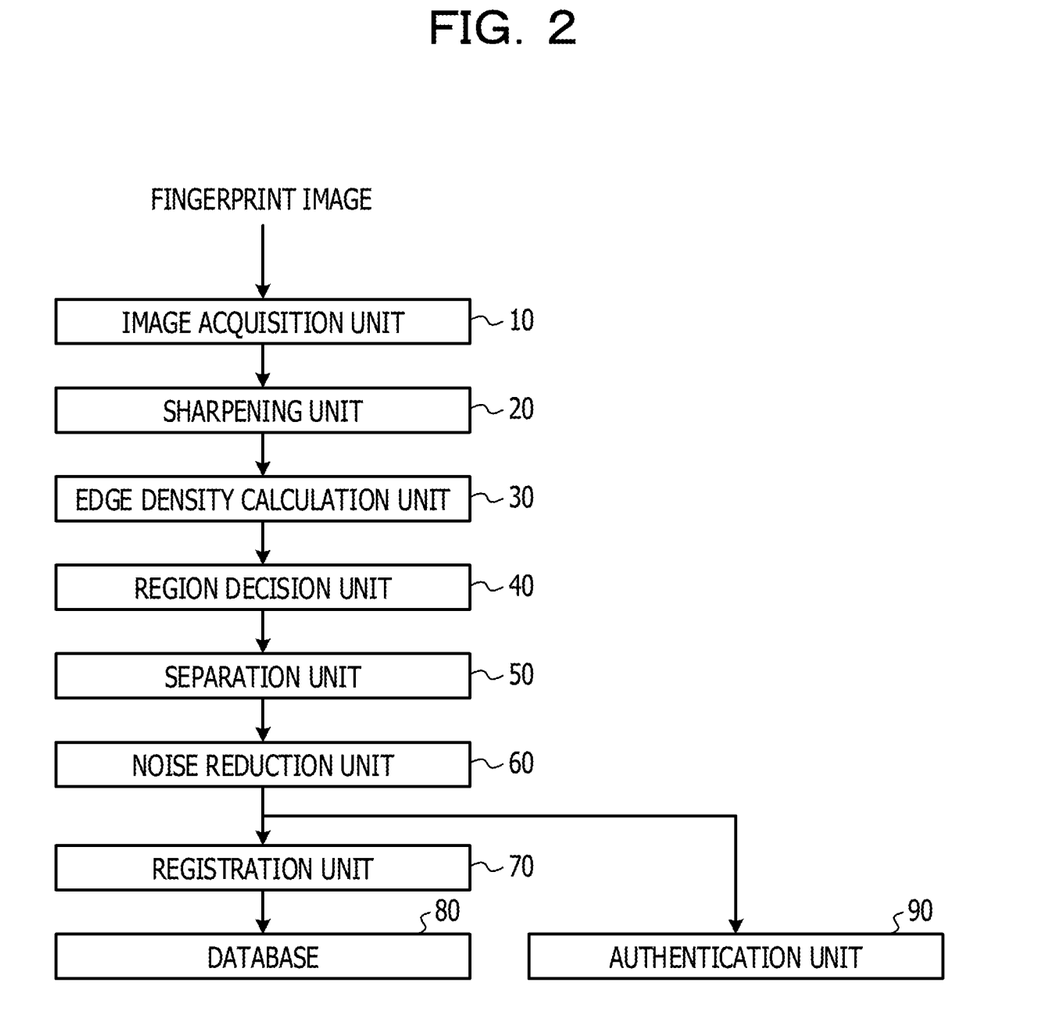
FIG. 2 is a block diagram of each of functions implemented by execution of an image processing program.

FIG. 2 is a block diagram of each function implemented by execution of an image processing program. By execution of the image processing program, an image acquisition unit 10, a sharpening unit 20, an edge density calculation unit 30, a region decision unit 40, a separation unit 50, a noise reduction unit 60, a registration unit 70, a database 80, an authentication unit 90 and so forth are implemented. It is to be noted that, although the apparatus of FIGS. 1 and 2 is depicted such that it is configured as a standalone terminal, the apparatus is not limited to this. For example, the present embodiment may be applied also to a system of a client server. In the embodiment described below, for the simplification of the description, an example of a terminal of the standalone type is described.

(Registration Process)

Figure 3:
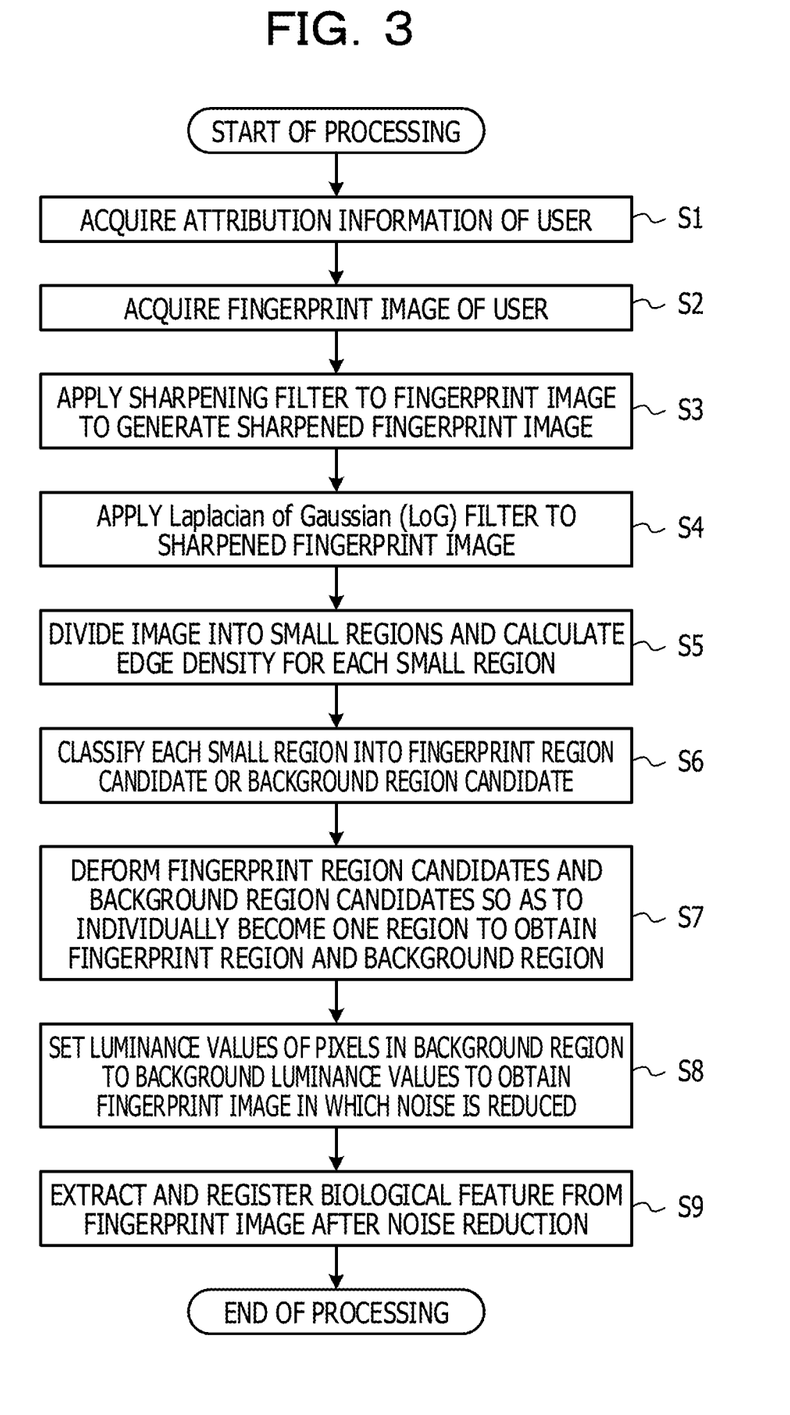
FIG. 3 is a flow chart exemplifying a registration process.

FIG. 3 is a flow chart exemplifying details of a registration process. In the following, the registration process is described with reference to FIGS. 1 to 3. First, the attribute information acquisition unit 107 acquires attribute information of a user (step S1). Then, the image acquisition unit 10 acquires a fingerprint image of the user from the biological sensor 105 (step S2). For example, the biological sensor 105 acquires a fingerprint image of a given finger of the user by that the user places a finger on a sensor face or slidably moves a finger on the sensor face.

Figure 4A:
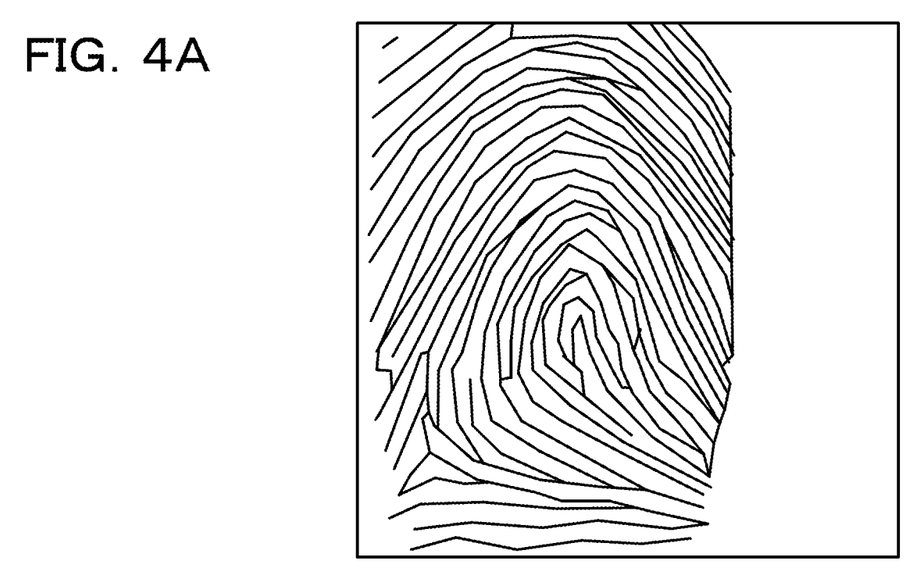
FIG. 4A is a view exemplifying a fingerprint image.
Figure 4B:
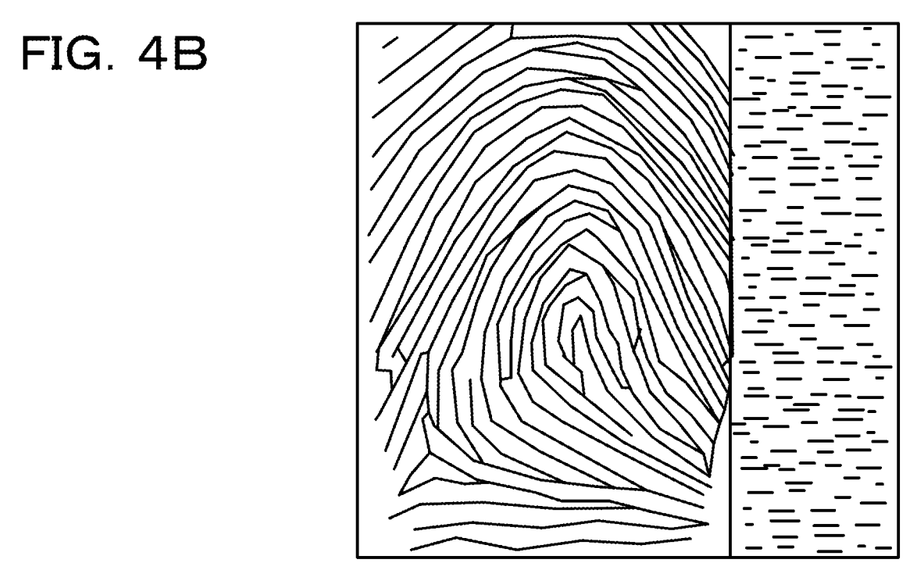
FIG. 4B is a view exemplifying a fingerprint image in which noise is included in a background region.

FIG. 4A is a view exemplifying a fingerprint image. In the example of FIG. 4A, since the fingerprint image does not include noise, a fingerprint region and a background region may be distinguished from each other clearly. However, there is the possibility that various noise may be generated in the fingerprint image from various factors. For example, due to abnormality in sensitivity characteristic of the biological sensor 105, noise may appear in the background region in which no finger touches. FIG. 4B is a view exemplifying a fingerprint image in which noise is included in a background region. If such a fingerprint image including noise as just described is used, an erroneous feature point is detected in the background region, and this undesirably becomes a factor of false rejection and others acceptance. Therefore, the image processing apparatus 100 according to the present embodiment separates the background region including noise and the fingerprint region accurately from each other to reduce noise.

The sharpening unit 20 applies a sharpening filter to the fingerprint image acquired at step S2 to generate a sharpened fingerprint image (step S3). For example, the sharpening unit 20 applies a process for emphasizing edges to the fingerprint image to generate a sharpened fingerprint image. As a method for emphasizing edges, for example, a technique for convoluting such an unsharp mask as given by the following expression (1):

$$\begin{pmatrix} -1/4 & -1/2 & -1/4 \\ -1/2 & 4 & -1/2 \\ -1/4 & -1/2 & -1/4 \end{pmatrix} \quad (1)$$

Figure 5A:
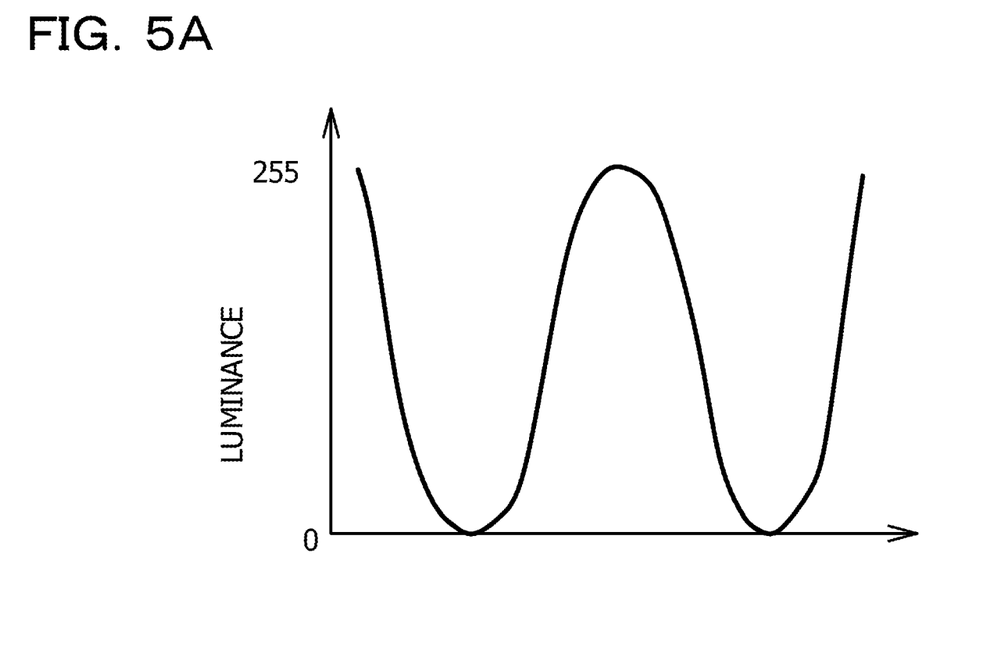
FIG. 5A is a view exemplifying luminance values in a fingerprint region in a fingerprint image one-dimensionally along a horizontal direction of an image.
Figure 5B:
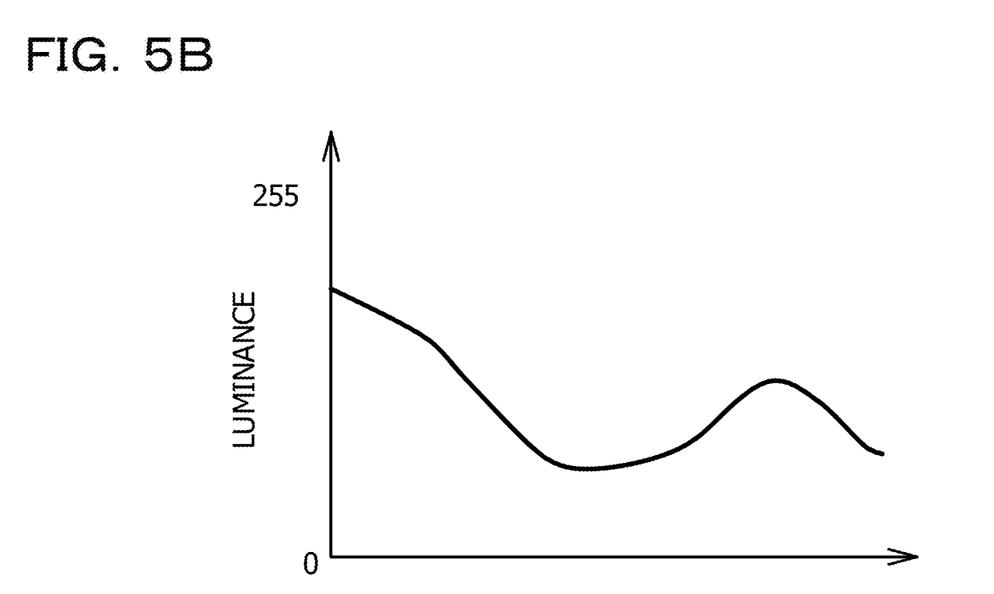
FIG. 5B is a view exemplifying luminance values in a background region, in which noise is included, one-dimensionally along a horizontal direction of an image.

Since, in the fingerprint region, ridges exist in a regularly lined up state toward a given direction, strong edges at which the luminance value indicates a steep variation and flat portions that are not the edges are distributed regularly along the ridges. On the other hand, in the background region in which noise is included, weak edges that indicate a gentle variation of the luminance value are distributed irregularly and a small number of flat portions exit. FIG. 5A is a view exemplifying luminance values in a fingerprint region in a fingerprint image one-dimensionally along a horizontal direction of an image. FIG. 5B is a view exemplifying luminance values in a background region, in which noise is included, one-dimensionally along a horizontal direction of an image. In FIGS. 5A and 5B, the axis of abscissa indicates a position in the horizontal direction. As exemplified in FIG. 5A, at fingerprint ridge portions, the luminance value indicates a value close to 0, but at fingerprint valley portions or in the background region in which no fingerprint exists, the luminance value indicates a value close to 255. As exemplified in FIG. 5B, in the case where noise exits, a value close to 0 appears also in the background region.

Figure 6A:
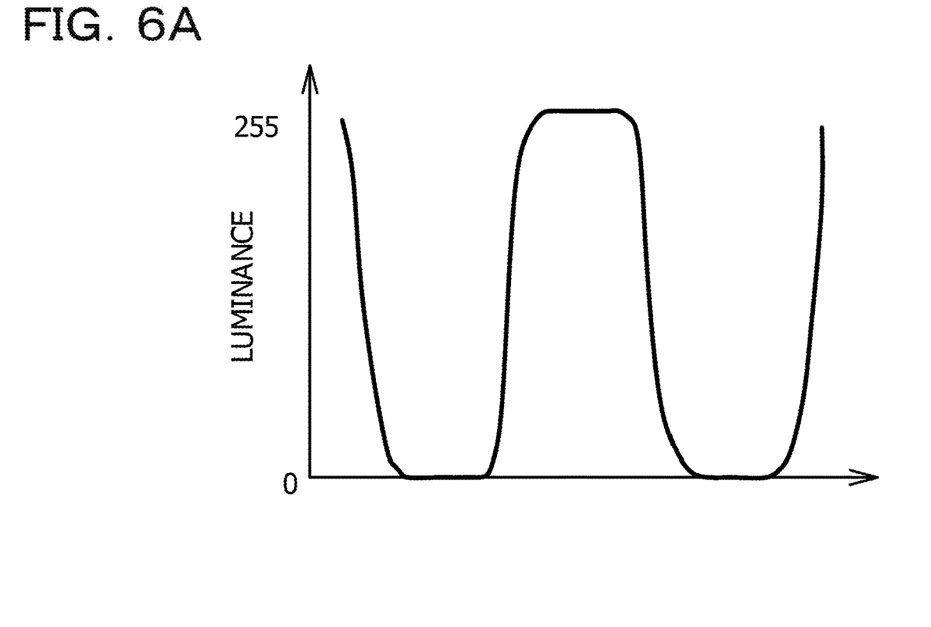
FIG. 6A is a view exemplifying luminance values in a case where sharpening is performed for luminance values in FIG. 5A.
Figure 6B:
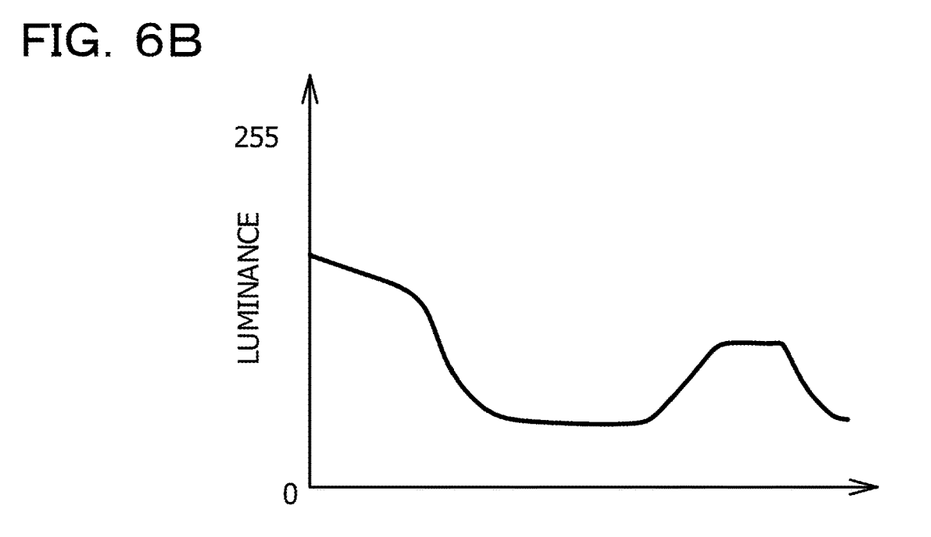
FIG. 6B is a view exemplifying luminance values in a case where sharpening is performed for luminance values in FIG. 5B.

FIG. 6A is a view exemplifying luminance values in a case where sharpening is performed for luminance values in FIG. 5A. FIG. 6B is a view exemplifying luminance values in a case where sharpening is performed for luminance values in FIG. 5B. Although, in an original fingerprint image, a location at which an edge becomes ambiguous by an influence of a state of a finger surface, a manner of touch with the sensor or the like sometimes appears, by emphasizing edges by a sharpening process, the influence is reduced, and consequently, the edge detection accuracy by the second order differential filter may be enhanced. Meanwhile, also in the background region in which noise is included, since edges are emphasized by the sharpening process, the noise increases. However, since a local change degree of the luminance differs between the background region including the noise and the fingerprint region, the two regions may be distinguished from each other.

Figure 7A:
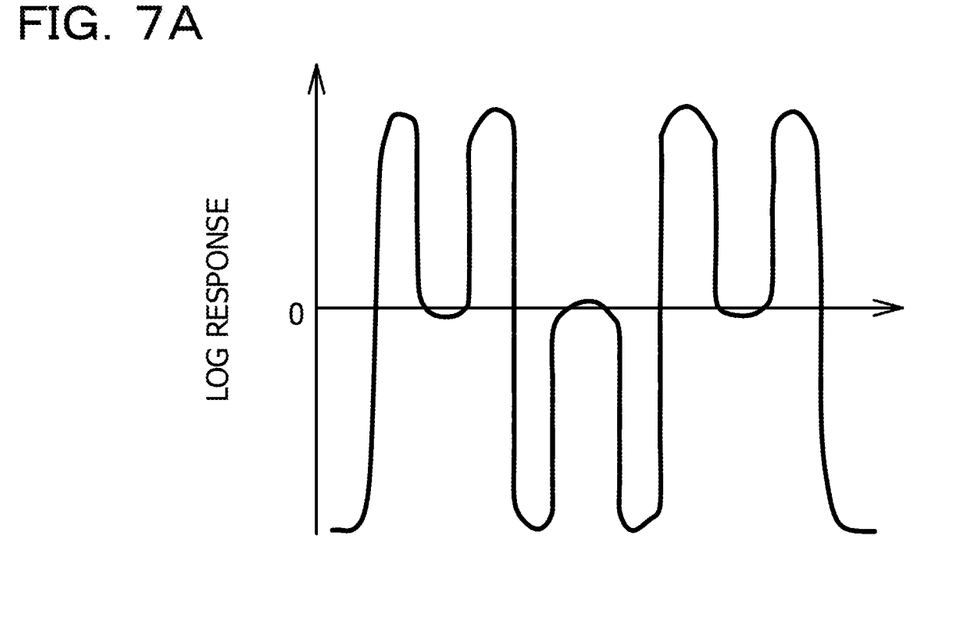
FIG. 7A is a view exemplifying a response of a second order differential filter to FIG. 6A.
Figure 7B:
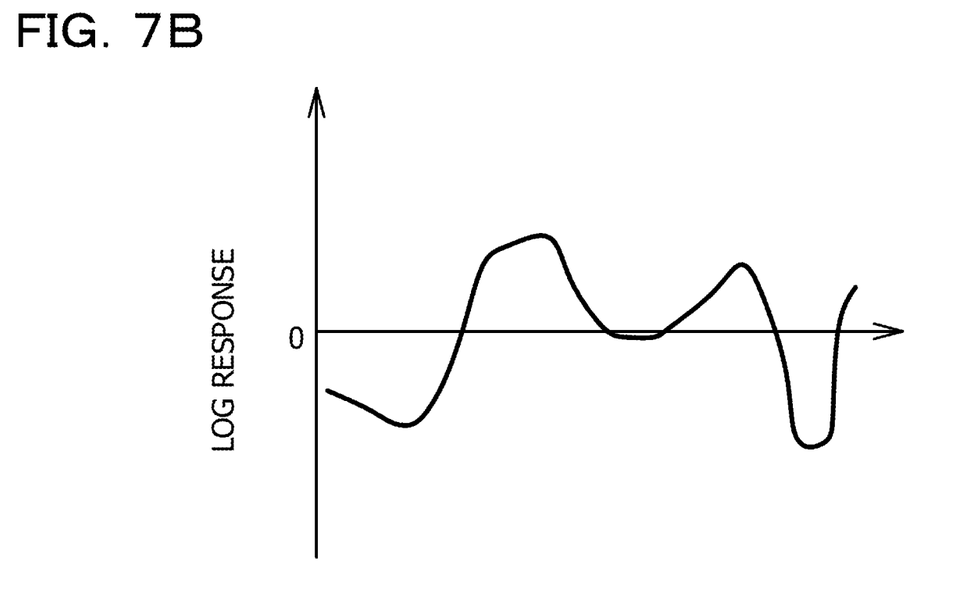
FIG. 7B is a view exemplifying a response of a second order differential filter to FIG. 6B.

Then, the edge density calculation unit 30 divides the sharpened fingerprint image into a plurality of small regions and calculates, for each of the plurality of small regions, the ratio of pixels of which the degree of change of the luminance value with respect to peripheral pixels is equal to or higher than a threshold value and included in the small region as an edge density. For example, the edge density calculation unit 30 first applies a second order differential filter such as a Laplacian of Gaussian (LOG) filter to the sharpened fingerprint image generated at step S3 (step S4). The LoG filter may be represented, for example, like an expression (2) given below. By convolving the LoG filter for the sharpened image as represented by an expression (3) given below, a response of the second order differential filter may be obtained. In the expression (3) given below, Ix represents the sharpened fingerprint image. In the expression (2) given below, (x, y) represents coordinates on the sharpened fingerprint image, and a represents the size of a window. It is to be noted that, as the degree of change of the luminance value becomes steeper, the absolute value of the response of the second order differential filter increases. Accordingly, by calculating an absolute value of the response of the second order differential filter, it is possible to detect whether or not a steep edge exists. FIG. 7A is a view exemplifying a response of a second order differential filter to FIG. 6A. FIG. 7B is a view exemplifying a response of a second order differential filter to FIG. 6B. As exemplified by FIG. 7A, in the fingerprint region, a value having a high absolute value appears periodically. As exemplified in FIG. 7B, in the background region in which noise is included, values having a high absolute value decrease. It is to be noted that, in FIGS. 7A and 7B, inflection points in FIGS. 6A and 6B reduce to zero.

$$LoG(x, y) = \frac{-1}{\pi\sigma^4}\left[1 - \frac{x^2 + y^2}{2\sigma^2}\right]e^{-\frac{x^2+y^2}{2\sigma^2}} \quad (2)$$

$$LoG \otimes Ix \quad (3)$$

Then, the edge density calculation unit 30 divides the sharpened fingerprint image into small regions and calculates an edge density by calculating an existence ratio of pixels in regard to which the response of the second order differential filter is equal to or higher than a given value for each small region (step S5). For example, the edge density calculation unit 30 generates a plurality of small regions of squares of 8×8 pixels to divide the sharpened fingerprint image into the small regions. Then, the edge density calculation unit 30 calculates, for each small region, the number N of pixels in regard to which the absolute value of the response of the second order differential filter is equal to or higher than a given threshold value Th1 and divides N by the pixel number included in the small region to determine an edge density D.

In the fingerprint region, the value of the edge density D is high, but in the background region in which noise is included, the value of the edge density D is low. Therefore, the region decision unit 40 decides any small region in which the edge density D is equal to or higher than a given threshold value Th2 as a fingerprint region candidate while it decides any other region as a background region candidate to classify the small regions into fingerprint region candidates and background region candidates (step S6).

Figure 8:
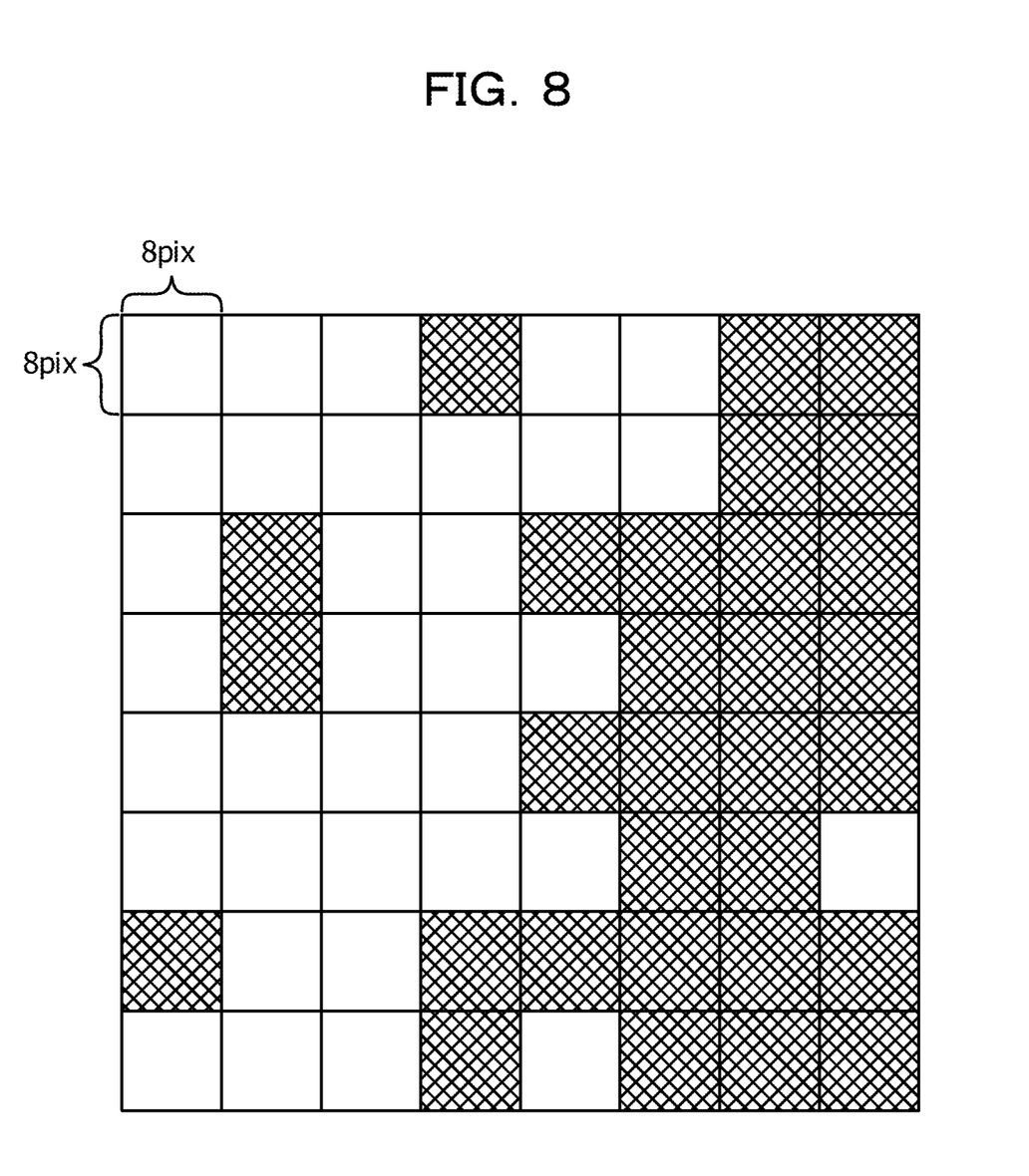
FIG. 8 is a view exemplifying fingerprint region candidates and background region candidates.

Incidentally, a calculated fingerprint region candidate or a background region candidate is sometimes decided in error by an influence of a foreign article attached to the sensor face, a scratch on the finger surface or the like. In this case, sets of the fingerprint region candidates and sets of the background region candidates sometimes present such a figure that has holes with enclaves as exemplified in FIG. 8. It is to be noted that, in FIG. 8, each white square indicates a background region candidate while each shadowed square indicates a fingerprint region candidate. However, each of an actual fingerprint region and an actual background region does not include any enclave and is a hole-free region. Therefore, the separation unit 50 performs an expansion process and a contraction process of morphology operation for the sets of the fingerprint region candidates and the sets of the background region candidates to deform the candidates to generate one fingerprint region and one background region having no enclave (step S7).

Figure 9:
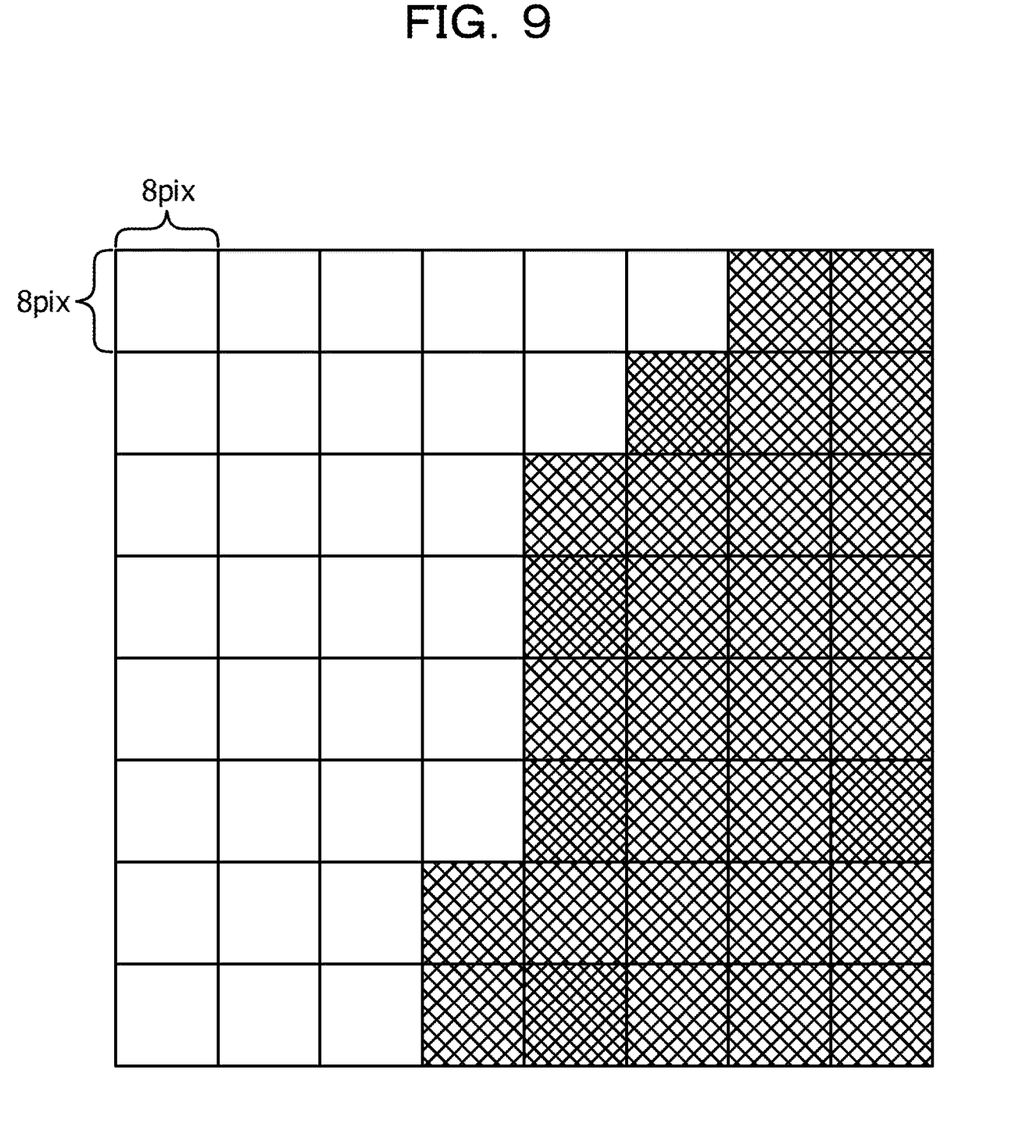
FIG. 9 is a view exemplifying fingerprint region candidates and background region candidates.

According to the expansion process, an operation for deciding, in the case where one or more fingerprint region candidates exist in small regions neighboring (4 neighbor or 8 neighbor) with a small region decided as a background region candidate, the small region decided as a background region candidate newly as a fingerprint region candidate is performed for all small regions decided as the background region candidates. According to the contraction process, an operation for deciding, in the case where one or more background region candidates exist in small regions neighboring (4 neighbor or 8 neighbor) with a small region decided as a fingerprint region candidate, the small region decided as a fingerprint region candidate newly as a background region candidate is performed for all small regions decided as the fingerprint region candidates. By performing the expansion process by i times and performing the contraction process by i times in this order, the background region candidates existing as enclaves in the fingerprint region candidates may be reduced. By performing the contraction process by j times and performing the expansion process by j times in this order, the fingerprint region candidates existing as enclaves in the background region candidates may be reduced. By the processes, a fingerprint region candidate and a background region candidate having no enclave are generated as exemplified in FIG. 9 and are set as a fingerprint region and a background region, respectively.

Then, the noise reduction unit 60 sets the luminance value of each of the pixels included in the background region to a background luminance value equal to or higher than a given value thereby to obtain a fingerprint image in which background noise is reduced (step S8). The background luminance value is, in the present embodiment, 255 as an example.

Then, the registration unit 70 extracts a biological feature from the fingerprint image generated at step S8 and registers the biological feature as a registration biological feature in an associated relationship with the attribute information acquired at step S1 into the database 80 (step S9). The registration process ends therewith.

(Authentication Process)

Figure 10:
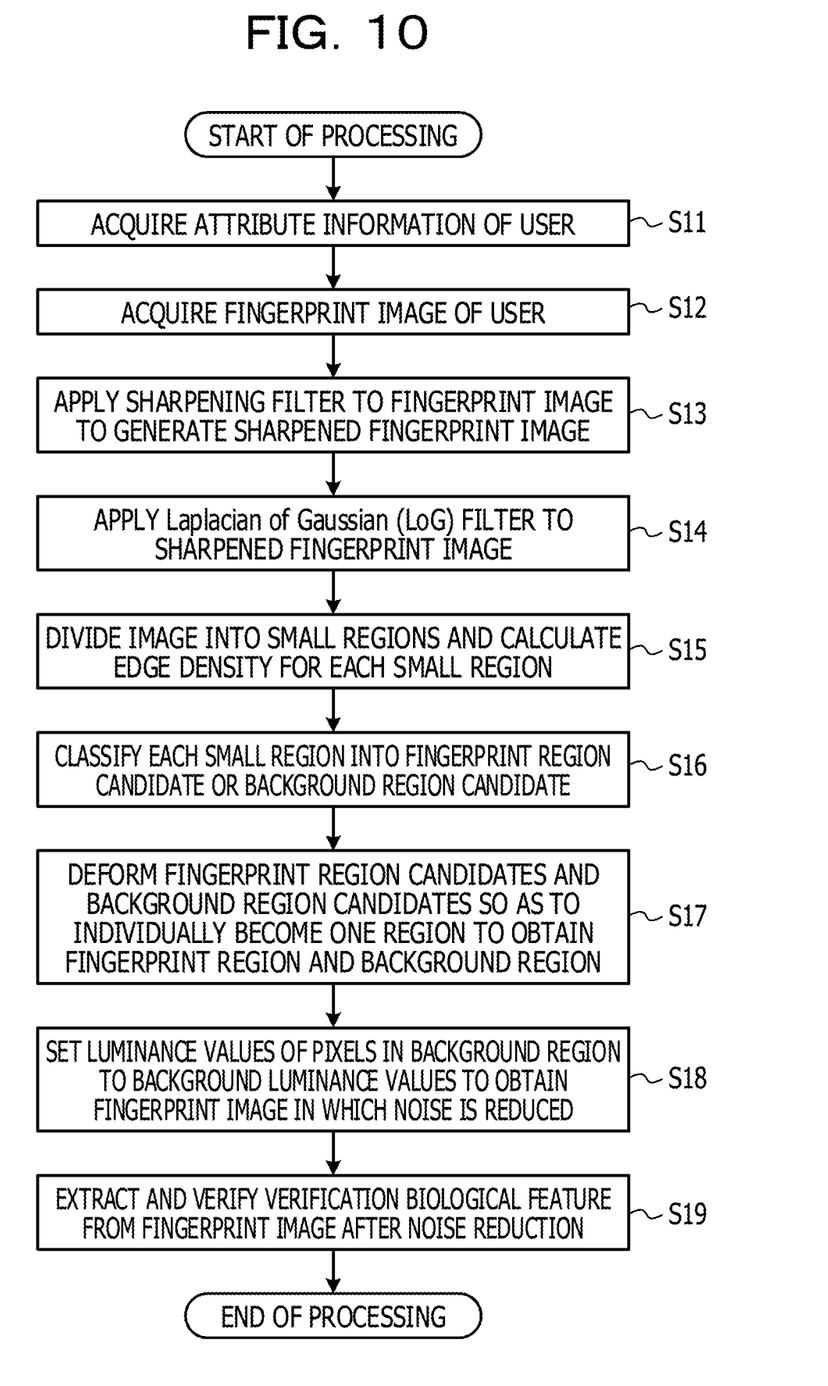
FIG. 10 is a flow chart exemplifying details of an authentication process.

FIG. 10 is a flow chart exemplifying details of an authentication process executed in a case when a user performs authentication after a registration process. As exemplified in FIG. 10, processes similar to those at steps S1 to S8 are executed at steps S11 to S18, respectively. Then, the authentication unit 90 extracts a fingerprint feature as a verification biological feature from the fingerprint image after the noise reduction. Then, the authentication unit 90 reads out the registration biological features associated with the attribute information acquired at step S11 from the database 80 and verifies the verification biological feature with the registration biological features (step S19).

For example, the authentication unit 90 calculates a similarity between the verification biological feature and the registration biological features. The similarity represents that, as the value thereof increases, the similarity of the biological features to each other increases, and, for example, where the biological features are represented by feature vectors, the similarity is the reciprocal of a Euclidean distance between them. For example, the authentication unit 90 performs identification decision by a threshold value process of the similarity. For example, in the case where the similarity is equal to or higher than a given threshold value, the authentication unit 90 decides that the registered person and the person to be verified are the same person but decides, in the case where the verification score is lower than the given threshold value, the two persons are different from each other. It is to be noted that, without executing step S11, 1:N authentication may be performed by verifying the verification biological feature with an unspecified large number of registration biological features and performing identification by a threshold value process of the highest similarity.

According to the present embodiment, by emphasizing edges of a fingerprint pattern included in a fingerprint image, a sharpened image of the fingerprint image may be generated. Consequently, edges of a fingerprint pattern may be detected with high accuracy. Then, from the sharpened image, an edge density may be calculated based on a local change of the luminance. Since the edge density is high in a fingerprint region, by calculating the edge density, each of pixels may be classified into those of a fingerprint region and a background region with high accuracy.

Preferably, the sharpened image is divided into a plurality of small regions and, in each of the small regions, the ratio of pixels in regard to each of which the degree of change of the luminance value from that of a peripheral pixel is equal to or higher than a threshold value from among the pixels included in the small region is calculated as the edge density. In this case, the calculation accuracy of the edge density is enhanced.

More preferably, a second order differential filter is applied to the sharpened image to divide the sharpened image into a small regions and, for each of the plurality of small regions, the ratio of pixels in regard to which the absolute value of the response of the second order filter is equal to or higher than a threshold value from among the pixels included in the small region is calculated as the edge density. In this case, the calculation accuracy of the edge density is further enhanced.

By deforming the sharpened image such that sets of fingerprint region candidates and sets of background region candidates individually become figures having no hole therein, the sharpened image may be separated into a fingerprint region and a background region. By setting the luminance values of the separated background region to luminance values equal to or higher than the given value, noise in the background region may be reduced.

(Modification)

Figure 11:
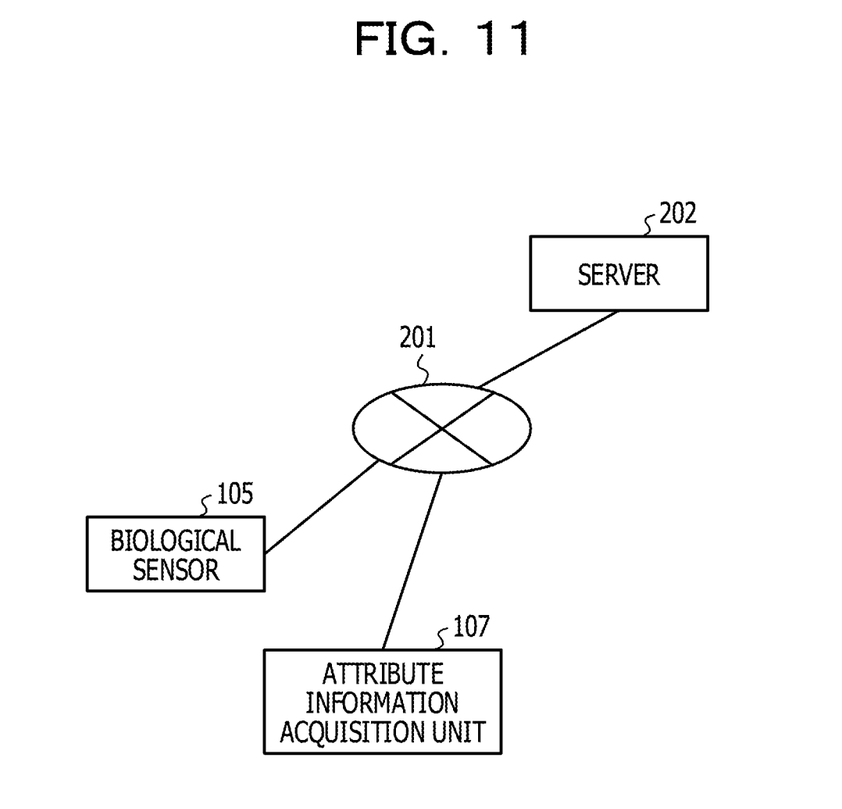
FIG. 11 is a view exemplifying an image processing system according to a modification.

FIG. 11 is a view exemplifying an image processing system according to a modification. In the examples described above, the components of FIG. 2 acquire a biological image from the biological sensor 105, acquires attribute information from the attribute information acquisition unit 107 and performs a registration process and an authentication process. As an alternative, a server 202 having the function of the components of FIG. 2 may acquire a biological image from the biological sensor 105 and acquire attribute information from the attribute information acquisition unit 107 through an electric communication line 201 such as the Internet.

In the example described above, the sharpening unit 20 functions as an example of a generation unit that emphasizes edges of a fingerprint pattern included in a fingerprint image to generate a sharpened image of the fingerprint image. The edge density calculation unit 30 functions as an example of a calculation unit that calculates an edge density based on a local change of the luminance from the sharpened image. The region decision unit 40 and the separation unit 50 function as an example of a decision unit that decides based on the edge density whether each pixel of the sharpened image is in a fingerprint region or a background region. The separation unit 50 functions as an example of a separation unit that separates the sharpened image into a finger region and a background region by deforming the sharpened image such that sets of fingerprint region candidates and sets of background region candidates individually become figures having no hole therein. The noise reduction unit 60 functions as an example of a noise reduction unit that reduces noise in the background region by setting the luminance values in the background region separated by the separation unit to luminance values equal to or higher than a given value.

While the embodiment of the present technology is described in detail, the technology is not limited to the specific embodiment and may be modified and altered in various manners without departing from the subject matter of the technology set forth in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus, comprising:
a memory; and
a processor coupled to the memory, wherein the processor:
generates, by emphasizing edges, which correspond to changes of luminance of a fingerprint pattern included in a fingerprint image, a sharpened image of the fingerprint image;
applies a second order differential filter to the sharpened image;
divides the sharpened image into a plurality of small regions; and
calculates, for each of the plurality of small regions, a ratio of pixels in regard to which an absolute value of a response of the second order differential filter is equal to or higher than a threshold value from among pixels included in the small region as the edge density; and
decides based on the edge density whether each of pixels of the sharpened image is in a fingerprint region or a background region.

2. The information processing apparatus according to claim 1, wherein the processor divides the sharpened image into a plurality of small regions and calculates, for each of the plurality of small regions, a ratio of pixels each of which a degree of change of a luminance value from a luminance value of a peripheral pixel is equal to or higher than a threshold value from among pixels included in the small region as the edge density.

3. The information processing apparatus according to claim 1, wherein the second order differential filter is a Laplacian of Gaussian filter.

4. The information processing apparatus according to claim 1, wherein the processor classifies each of pixels of the sharpened image into a fingerprint region candidate or a background region candidate in response to the edge density; and deforms the sharpened image such that sets of fingerprint region candidates and sets of background region candidates individually become figures having no hole therein to separate the sharpened image into the fingerprint region and the background region.

5. The information processing apparatus according to claim 4, wherein the processor applies an expansion process and a contraction process of morphology operation to the sets of the fingerprint region candidates and the sets of the background region candidates to deform the sharpened image such that the fingerprint region and the background region individually form one figure in the sharpened image.

6. The information processing apparatus according to claim 1, wherein noise in the background region is reduced by setting luminance values in the background region decided by the processor to luminance values equal to or higher than a given value.

7. The information processing apparatus according to claim 6, wherein the processor extracts a verification biological feature in the image in which the noise is reduced; and verifies a registration biological feature registered in advance and the verification biological feature with each other to perform individual authentication.

8. An image processing method, comprising:
generating, by a computer, by emphasizing edges, which correspond to changes of luminance of a fingerprint pattern included in a fingerprint image, a sharpened image of the fingerprint image;
applying a second order differential filter to the sharpened image;
dividing the sharpened image into a plurality of small regions; and
calculating, for each of the plurality of small regions, a ratio of pixels in regard to which an absolute value of a response of the second order differential filter is equal to or higher than a threshold value from among pixels included in the small region as the edge density; and
deciding based on the edge density whether each of pixels of the sharpened image is in a fingerprint region or a background region.

9. The image processing method according to claim 8, further comprising:
dividing the sharpened image into a plurality of small regions, and
calculating, for each of the plurality of small regions, a ratio of pixels each of which a degree of change of a luminance value from a luminance value of a peripheral pixel is equal to or higher than a threshold value from among pixels included in the small region as the edge density.

10. The image processing method according to claim 8, wherein the second order differential filter is a Laplacian of Gaussian filter.

11. The image processing method according to claim 8, further comprising:
classifying each of pixels of the sharpened image into a fingerprint region candidate or a background region candidate in response to the edge density; and
deforming the sharpened image such that sets of fingerprint region candidates and sets of background region candidates individually become figures having no hole therein to separate the sharpened image into the fingerprint region and the background region.

12. The image processing method according to claim 11, further comprising:
applying an expansion process and a contraction process of morphology operation to the sets of the fingerprint region candidates and the sets of the background region candidates to deform the sharpened image such that the fingerprint region and the background region individually form one figure in the sharpened image.

13. The image processing method according to claim 8, wherein noise in the background region is reduced by setting luminance values in the background region decided by the processor to luminance values equal to or higher than a given value.

14. The image processing method according to claim 13, further comprising:
extracting a verification biological feature in the image in which the noise is reduced; and
verifying a registration biological feature registered in advance and the verification biological feature with each other to perform individual authentication.

15. A non-transitory computer-readable medium recording an image processing program which causes a computer to perform a process, the process comprising:
generating, by emphasizing edges, which correspond to changes of luminance of a fingerprint pattern included in a fingerprint image, a sharpened image of the fingerprint image;
applying a second order differential filter to the sharpened image;

dividing the sharpened image into a plurality of small regions; and calculating, for each of the plurality of small regions, a ratio of pixels in regard to which an absolute value of a response of the second order differential filter is equal to or higher than a threshold value from among pixels included in the small region as the edge density; and deciding based on the edge density whether each of pixels of the sharpened image is in a fingerprint region or a background region.

16. The non-transitory computer-readable medium according to claim 15, further comprising:

dividing the sharpened image into a plurality of small regions, and calculating, for each of the plurality of small regions, a ratio of pixels each of which a degree of change of a luminance value from a luminance value of a peripheral pixel is equal to or higher than a threshold value from among pixels included in the small region as the edge density.

17. The non-transitory computer-readable medium according to claim 15, further comprising:

classifying each of pixels of the sharpened image into a fingerprint region candidate or a background region candidate in response to the edge density; and deforming the sharpened image such that sets of fingerprint region candidates and sets of background region candidates individually become figures having no hole therein to separate the sharpened image into the fingerprint region and the background region.

* * * * *